(Model.)
W. C. MOORE.
GARDEN IMPLEMENT.
No. 270,243.  Patented Jan. 9, 1883.
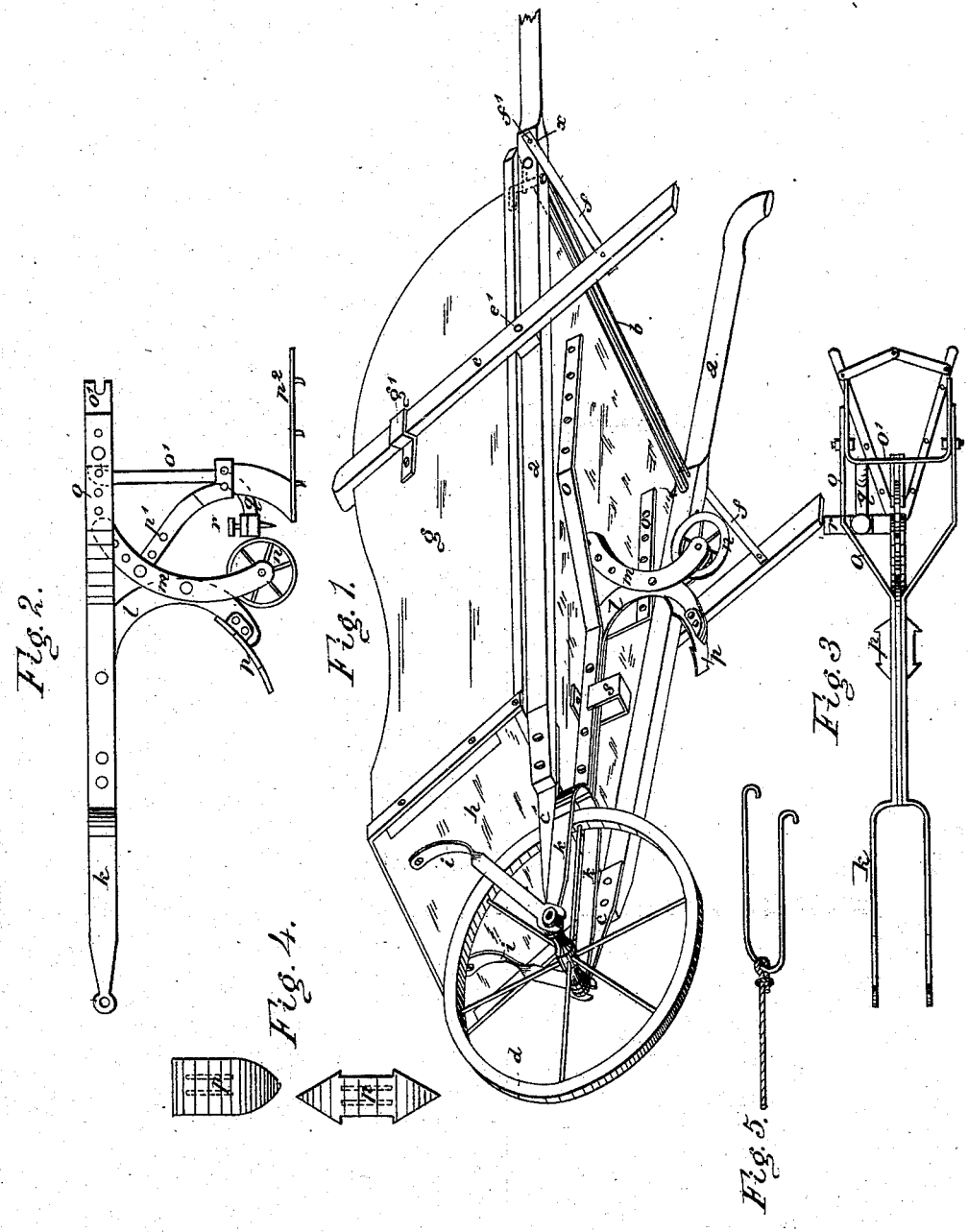
WITNESSES:
INVENTOR:
W. C. Moore
BY Munn & Co.
ATTORNEYS.
N. PETERS. Photo-Lithographer, Washington, D. C.

UNITED STATES PATENT OFFICE.

WILLIAM C. MOORE, OF SPRINGFIELD, MISSOURI.

GARDEN IMPLEMENT.

SPECIFICATION forming part of Letters Patent No. 270,543, dated January 9, 1883.

Application filed April 29, 1882. (Model.)

*To all whom it may concern:*

Be it known that I, WILLIAM C. MOORE, of Springfield, in the county of Greene and State of Missouri, have invented a new and Improved Garden Implement, of which the following is a full, clear, and exact description.

The object of my invention is to furnish a combined implement for the use of market-gardeners and farmers in the cultivation of all kinds of vegetables; and it consists in the combination and arrangement of parts, substantially as hereinafter more fully set forth and claimed.

Reference is to be had to the accompanying drawings, forming a part of this specification, in which similar letters of reference indicate corresponding parts in all the figures.

Figure 1 is a perspective view of the combined implement. Fig. 2 is a side elevation of the plow attachment, and Fig. 3 is a plan view of the plow and cultivator attachment. Figs. 4 and 5 are detail views.

The frame of the implement consists of the two side bars or handles $a$ $a$, connected together at their rear ends by cross-bars $b$ and fitted at their forward ends with straps $c$ $c$, that are sustained on the axle of the wheel $d$. These bars or handles $a$ are connected in an inclined position in the manner of a wheelbarrow and form the barrow-frame.

$e$ $e$ are foot-pieces attached by bolts $e'$ to the handles $a$, and stiffened by bars $f$, that extend from near the lower ends of the foot-pieces to the handles $a$, where they take loosely upon pins $f'$, so that they can be readily disconnected.

$g$ $g$ are the side boards of the wheelbarrow, provided with loops $g'$, to take upon the foot-rest $e$, and entering at their forward ends into sockets formed at the ends of the front board, $h$. The front board, $h$, is stiffened by braces $i$, that are forked to take upon the front axle so that they can be readily removed.

$t$ is the bottom board.

The parts above described constitute the wheelbarrow proper. The plow and cultivator attachment is as follows:

$k$ is a forked bar, connected by its forked ends upon the axle of the wheel $d$, and extending backward beneath the bottom board to receive the plow-beam $l$, which is attached to the beam $k$ by bolts.

$m$ is a foot-piece pivoted to the beam $l$ and carrying the gage-wheel $n$, by which the depth of the plowing is regulated.

The plow $p$, attached upon the end of the beam $l$, may be either single or double pointed, according to the work that is to be done; and I have shown in Fig. 4 the two forms of plow that may be used.

$o$ $o$ are braces bolted to the rear end of the bar $k$, and formed at their rear ends with holes for connection to forked brace $o'$, by which the rake is suspended. (See Figs. 2 and 3.) $p'$ is a brace from the plow-beam $m$ and carrying the cultivator $p$.

$q$ is an arm formed at its upper end with the forks $o'$, for attachment to the rear ends of the bars $o$, and carrying at its lower end a rake-head, $r$, which is apertured to receive the end of the arm $q$, a set-screw being provided to retain the rake-head upon the arm. The arm $q$ carries the rake-head at one side of the bar $k$.

I have shown and described the various parts as connected in place and combined together; but it will be understood that these several parts are not to be used at once. When the wheelbarrow alone is required the bar $k$, carrying the plow, will be raised up out of the way and held by a hook, $s$, attached to the bottom board of the barrow, so that the plow shall not catch upon obstructions; or, if desired, the plow attachment may be entirely removed from the barrow.

When the plow is required for use the parts constituting the barrow, with the exception of the two handles $a$ $a$, will be removed.

The rake can be used at the same time with the plow for the purpose of raking and smoothing the ground that has been worked upon, and it can be raised and lowered, as may be desired, or removed entirely.

The cultivator attachment is convenient for cultivating between rows of small plants, and can be conveniently used with very narrow and crooked rows. In that respect it will do the work much more rapidly and conveniently than it can be done by a number of men working with hoes.

This combination furnishes the farmer with two implements at but little more expense than one. The construction is simple, and there is nothing to get out of order. It is very durable, as nearly all the parts can be made of metal. The wheel being of large size, the implement will be light-running and can be drawn readily by hand-power.

In Fig. 5 I have shown a draft-hook adapted for drawing the implement when used as a plow. This consists simply of a hook-clevis, which is to be connected to the axle of the wheel $d$, and is provided with a rope for drawing the plow.

Having thus described my invention, I claim as new and desire to secure by Letters Patent—

The combined gardening and marketing implement, consisting of the wheelbarrow-frame $a$, its wheel and axle, the bifurcated bar $k$, hung upon said axle and having the apertured arm $o$, the cultivator or plow beam $l$, the gage-wheel and its standard $m$, and adapted to carry the rake-standard $q\ o'$, substantially as and for the purpose set forth.

WILLIAM C. MOORE.

Witnesses:
  JONATHAN ECHELBERRY,
  ALFRED WALTER.